UNITED STATES PATENT OFFICE.

EUGEN ANDERWERT, HERMAN FRITZSCHE, AND HEINRICH SCHOBEL, OF BASEL, SWITZERLAND, ASSIGNORS TO SOCIETY OF CHEMICAL INDUSTRY IN BASLE, OF BASEL, SWITZERLAND.

SUBSTANTIVE ORTHOOXYAZO DYESTUFFS AND A PROCESS OF MAKING SAME.

1,210,751.  Specification of Letters Patent.  Patented Jan. 2, 1917.

No Drawing.  Application filed October 8, 1915. Serial No. 54,891.

*To all whom it may concern:*

Be it known that we, EUGEN ANDERWERT, HERMAN FRITZSCHE, and HEINRICH SCHOBEL, all three chemists and citizens of the Swiss Republic, and residents of Basel, Switzerland, have invented new Substantive Orthooxyazo Dyestuffs and Processes of Making Same, of which the following is a full, clear, and exact specification.

We have found that valuable new substantive orthooxyazo dyestuffs are obtained by combining 2:5:7-aminonaphtholsulfonic acid or 2:5:1:7-aminonaphtholdisulfonic acid or one of their derivatives with the tetrazo derivative of one of the orthoaminophenol derivatives corresponding to the formula

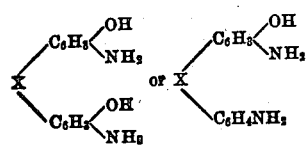

wherein X stands for a diphenyl-binding or one of the groups

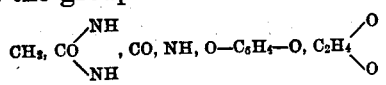

As parent materials corresponding to the given formulas can be employed for instance the following compounds and their derivatives viz:

the o-o-(3.3')-dioxybenzidin:

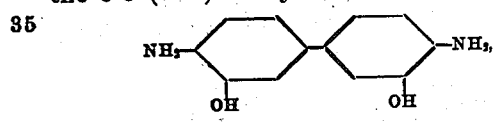

the diamidodioxydiphenylmethane:

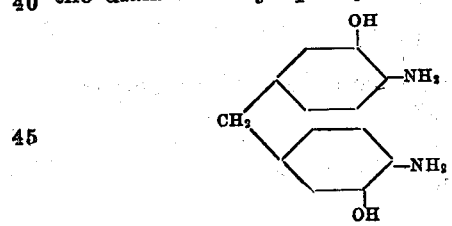

the diamidodioxydiphenylurea:

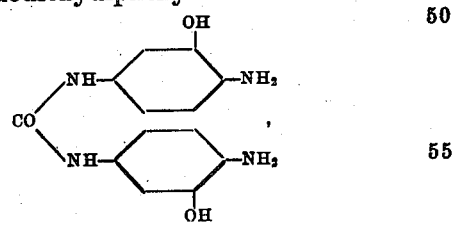

the diamidodioxydiphenylketone:

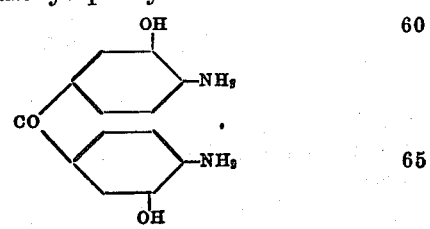

the diamidodioxydiphenylamin:

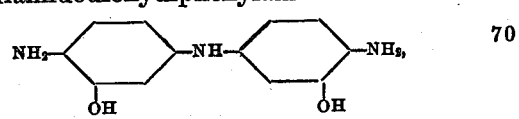

the hydroquinon-p-p-diaminodioxydiphenylether:

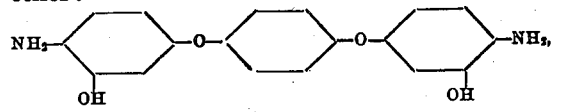

the diamidodioxy-p-p-diphenylethylenether:

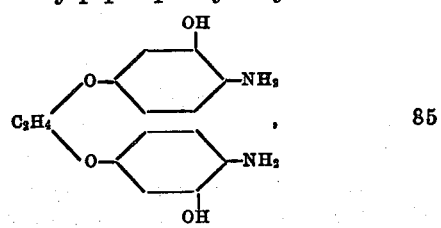

The new dyestuffs are intensely colored powders yielding with concentrated sulfuric acid strongly colored solutions and dissolving in water with red to yellow and violet colorations, which are intensively changed by addition of sodium carbonate or of soda lye and dyeing cotton, wool, silk, mixed goods, straw, wood and paper various tints according to the methods used for the known substantive dyestuffs.

The process is illustrated by the following examples:

Example 1: 21.6 kg. o-o-(3-3')-dioxybenzidin

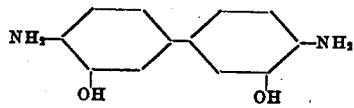

(obtained by saponifying dianisidin with aluminium chlorid) are tetrazotized and poured into a solution of 50 kg. 2:5:7-aminonaphtholsulfonic acid and 50 kg. sodium carbonate in water. The combination occurs very slowly and requires a long time. The dyestuff isolated in the usual way dyes cotton violet tints.

Example 2: 23 kg. p-p-diamino-m-m-dioxydiphenylmethane.

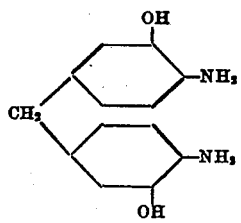

(obtained by condensation of orthonitrophenol with formaldehyde and subsequent reduction) are transformed in the usual manner into the corresponding tetrazo derivative. This latter is poured into a solution of 50 kg. 2:5:7 aminonaphtholmonosulfonic acid and 50 kg. sodium carbonate in water. The combination occurs slowly and is at the end aided by a feeble warming. The dyestuff isolated in the usual manner dyes cotton deep blue-roseate.

Example 3: 43.4 kg. diaminodiphenylureadisulfonic acid

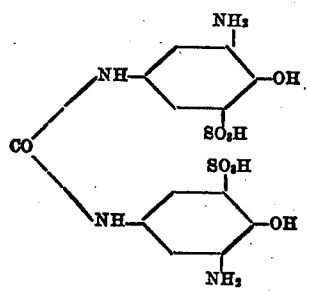

(obtained by introducing phosgen (carbonyl chlorid) into an alkaline solution of 2-nitro-4-amino-1-phenol-6-sulfonic acid and reducing subsequently) are dissolved with sodium carbonate and tetrazotized with 60 kg. hydrochloric acid and 14 kg. sodium nitrite and the resulting tetrazo derivative is combined with 75 kg. meta-aminobenzoyl-2:5:7-aminonaphtholsulfonic acid and 60 kg. sodium carbonate. The following day the mass is heated to 40° C. and the dyestuff salted out and isolated in the usual way. It dyes cotton a dull lilac.

The new dyestuffs dye cotton, wool, silk, mixed goods, straw, wood, paper, leather, etc., like the known substantive dyestuffs and can be employed for the production of lakes and as parent materials for the production of new valuable derivatives.

What we claim is:

1. The described process for the manufacture of new substantive orthooxyazo dyestuffs consisting in combining the orthooxytetrazo derivatives of the orthoaminophenol derivatives corresponding to the formula

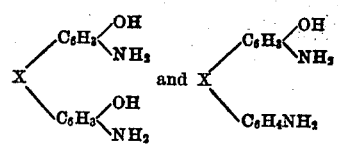

(wherein X stands for a diphenyl-binding or one of the groups

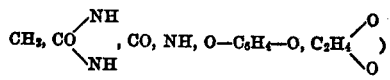

with 2:5:7-aminonaphtholsulfonic compound.

2. The described process for the manufacture of new substantive orthooxyazo dyestuffs consisting in combining the orthooxytetrazo derivatives of the orthoaminophenol derivatives corresponding to the formula

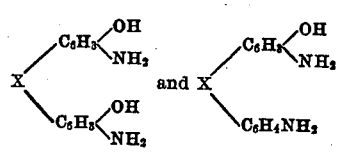

(wherein X stands for a diphenyl-binding or one of the groups

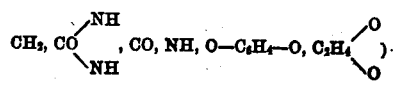

with a 2:5:1:7-aminonaphtholdisulfonic compound.

3. As new products, the described orthooxyazo dyestuffs corresponding to the formula

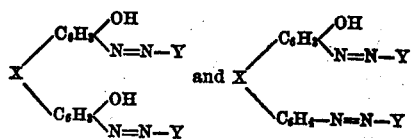

(wherein X stands for a diphenyl-binding or one of the groups

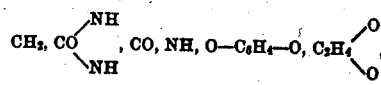

and Y for a sulfo derivative of 2:5-aminonaphthol containing a sulfo group in the 7-position), which constitute intensely colored powders yielding with concentrated sulfuric acid intensely colored solutions and dissolving in water with red and yellow to violet colorations which are intensively changed by addition of sodium carbonate or of soda-lye and dyeing cotton, wool, silk, mixed goods, straw, wood and paper various tints according to the methods used for the known substantive dyestuffs.

In witness whereof we have hereunto signed our names this 17th day of September 1915, in the presence of two subscribing witnesses.

EUGEN ANDERWERT.
DR. HERMAN FRITZSCHE.
DR. HEINRICH SCHOBEL.

Witnesses:
ARNOLD ZUBER,
AMAN I. RILLEY.